United States Patent Office 3,247,206
Patented Apr. 19, 1966

3,247,206
DIAZA-CYCLOALKANE SYNTHESIS
William Lassiter Yost, Long Valley, and Richard Bennett Margerison, Florham Park, N.J., assignors to Ciba Corporation, New York, N.Y., a corporation of Delaware
No Drawing. Filed Oct. 5, 1962, Ser. No. 228,760
11 Claims. (Cl. 260—268)

The present invention concerns a new process for the preparation of diaza-cyclic compounds. More especially, it relates to a new process for the preparation of diaza-cycloalkane compounds of the formula

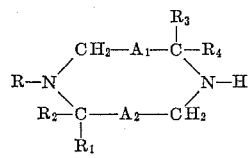

in which each of the radicals $A_1$ and $A_2$ stands for a direct bond or a lower alkylene radical, R stands for an organic substituent, and each of the groups $R_1$, $R_2$, $R_3$ and $R_4$ is hydrogen or an organic substituent.

Diaza-cycloalkane compounds prepared according to the process of this invention are useful per se, for example, as anthelmintic agents and the like, or, more particularly as intermediates for the manufacture of a variety of compounds useful, for example, as pharmaceuticals, germicides, pesticides, accelerators in the rubber synthesis and the like. Thus, upon exhaustive alkylation with a long-chain alkyl halide, e.g. dodecyl bromide and the like, they are converted into quaternary ammonium compounds, which are useful as germicides.

The process of this invention consists in treating a compound of the formula

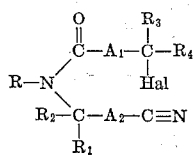

in which $A_1$, $A_2$, R, $R_1$, $R_2$, $R_3$ and $R_4$ have the previously-given meaning, and Hal is halogeno, with an aluminum hydride reducing reagent in the presence of an organic solvent, decomposing the resulting complex by adding an inorganic base and water, and isolating the desired diaza-cycloalkane compound from the organic solution.

In the starting material of the above procedure, the group Hal is especially halogeno having an atomic weight greater than 19, and stands above all for chloro, as well as bromo or iodo.

An aluminum hydride reducing reagent is particularly an alkali metal aluminum hydride, above all lithium aluminum hydride, as well as sodium aluminum hydride, or an alkaline earth metal aluminum hydride, e.g. magnesium aluminum hydride, or aluminum hydride itself, as well as aluminum borohydride or any other suitable aluminum hydride reducing reagent. If desired, an activator, such as aluminum chloride and the like, may be added to the reaction mixture to enhance the reactivity of the reducing reagent. Optimum yields of the desired product are obtained by using the aluminum hydride reagent in about stoichiometric amounts. Thus, about three moles of lithium aluminum hydride is preferably used per one mole of starting material. However, the reaction may also be carried out by using an excess or a small amount of the aluminum hydride reducing reagent. For example, from about one and one-half moles to about three moles, for example, about two moles of lithium aluminum hydride per one mole of starting material may be employed to form the desired product, albeit in somewhat lower yields.

Treatment of the starting material with the aluminum hydride reducing reagent is carried out in the presence of an organic solvent or mixture of such solvents; particularly useful are solvents which are inert towards the aluminum hydride reducing reagent and have a boiling point between about 35° and below about 150°. If desired, the solvent employed for the preparation of the mixture of the starting material and the aluminum hydride reagent may be replaced by another diluent; for example, the mixing of the starting material and the aluminum hydride reagent may be carried out in the presence of one inert solvent, e.g. tetrahydrofuran and the like, which may then be replaced by another inert, for example, higher boiling solvent, e.g. toluene, xylene and the like. Preferred diluents are, for example, ethers, e.g. tetrahydrofuran, diethyl ether, di-n-propyl ether, di-isopropyl ether and the like, hydrocarbons, e.g. benzene, toluene, xylene and the like, or any other suitable solvent or solvent mixtures.

The reaction is carried out at an elevated temperature, usually by refluxing the reaction mixture. The reaction is carried out at a temperature between about 35° and a temperature below the thermic decomposition point of the aluminum hydride reducing reagent (viz is about 150° for lithium aluminum hydride), preferably between about 35° and about 140°.

The resulting complex is decomposed and the inorganic portion precipitated in granular form suitable for filtration, by adding water and an inorganic base or a solution, especially an aqueous solution, thereof. About stoichiometric amounts of the base are used; sufficient water is added to achieve granulation of the inorganic precipitate without forming an aqueous layer. An alkali metal hydroxide, e.g. lithium hydroxide, sodium hydroxide, potassium hydroxide, or any other equivalent inorganic base, e.g. calcium hydroxide and the like, or preferably an aqueous solution of such base, which simultaneously provides all or part of the necessary amount of water, may serve as an inorganic base. As mentioned, at least a portion of the water is advantageously added in the form of an aqueous solution of the base; an additional amount of water may be given to the reaction mixture to complete the decomposition and ensure granulation of the inorganic precipitate, which is removed by filtration. The decomposition of the complex is usually carried out while cooling and maintaining a temperature below 30°.

The resulting inorganic precipitate is separated from the organic solution, for example, by filtration or any other equivalent procedure.

The desired diaza-cycloalkane compound is isolated from the organic solution, usually by evaporating the solvent. If desired, the resulting basic compound obtained as the residue after evaporating the solvent may be further purified according to known methods, for example, by treating it with a base, such as an alkali metal hydroxide, e.g. sodium hydroxide, potassium hydroxide and the like, an alkali metal carbonate, e.g. sodium carbonate, potassium carbonate and the like, ammonia or any other equivalent base, preferably in the presence of a solvent, e.g. toluene, water and the like, if necessary, extracting it with a suitable organic solvent, e.g. diethyl ether, benzene, toluene, ethyl acetate and the like, evaporating the solvent, and, if desired, distilling and/or crystallizing and recrystallizing the residue.

For various purposes, such as identification, further purification and the like, the diaza-cycloalkane compounds prepared according to the procedure of this invention may be converted into derivatives, such as, for example, acid addition salts, such as those with inorganic acids, e.g. hydrochloric, hydrobromic, nitric, thiocyanic, sulfuric, phosphoric acids and the like, or with organic acids, organic carboxylic acids, e.g. acetic, propionic, glycolic, lactic, pyruvic, oxalic, malonic, succinic, maleic, hydroxymaleic, fumaric, malic, tartaric, citric, benzoic, cinnamic, mandelic, salicylic, 4-aminosalicylic, 2-phenoxybenzoic, 2-acetoxybenzoic, nicotinic, isonicotinic acid and the like, or organic sulfonic acids, e.g. methane sulfonic, ethane sulfonic, 2-hydroxyethane sulfonic, ethane 1,2-disulfonic, benzene sulfonic, toluene sulfonic, naphthalene 2-sulfonic acid and the like, or salts with acidic organic nitro compounds, e.g. picric, picrolonic, flavianic acid and the like, or with metal complex acids, e.g. phosphotungstic, phosphomolybdic, chloroplatinic, Reinecke acid and the like.

A resulting free base may be converted into a salt thereof with an acid, such as one of the above-mentioned acids, for example, by reacting a solution of the free base in a suitable solvent or solvent mixture with the acid or a solution thereof, or with an anion exchange preparation and isolating the resulting salt.

An acid addition salt may be reconverted into the free compound, for example, by treating it with a suitable base, such as a metal hydroxide, e.g. lithium hydroxide, sodium hydroxide, potassium hydroxide, calcium hydroxide and the like, a metal carbonate, e.g. sodium, potassium or calcium carbonate or hydrogen carbonate and the like, ammonia or any other suitable reagent, such as a hydroxyl ion exchange preparation.

Other derivatives used for the identification and characterization of the compounds prepared according to the procedure of this invention are, for example, N-(N-substituted carbamyl) derivatives or, more particularly, N-(N-substituted thiocarbamyl) derivatives of the diaza-cycloalkane compounds. These derivatives may be prepared by reacting the compounds obtained by the procedure of this invention with an equimolar amount of an N-substituted isocyanate or, more especially, an N-substituted isothiocyanate, e.g. N-phenylisothiocyanate and the like, and are usually easily crystallizable derivatives, which may be purified by recrystallization.

The starting material used in the process of this invention is prepared according to known methods. For example, it may be manufactured by reacting a primary amine of the formula $R-NH_2$, in which R has the previously-given meaning, with a carbonyl compound of the formula $R_1(R_2)C=O$, in which $R_1$ and $R_2$ have the previously-given meaning, or a reactive derivative thereof (such as a bisulfite addition compound thereof, or, in case at least one of the groups $R_1$ and $R_2$ or both stand for hydrogen, a reactive polymer thereof) in the presence of hydrogen cyanide, or of a metal cyanide, particularly an alkali metal cyanide, e.g. sodium cyanide, potassium cyanide and the like (according to the Strecker Synthesis or the Zelinsky-Stadnikoff modification thereof for the preparation of amino-nitriles), whereby a nitrile compound of the formula $R-NH-C(R_1)(R_2)-C\equiv N$ is formed. The latter may also be prepared, by reacting an amine of the formula $R-NH_2$ or an amine, in which the nitrogen is substituted, in addition to the group $R_1$, by a protective group which prevents di-substitution of a primary amine and is easily removable (e.g. a benzal group, a carbo-benzoxy group and the like), with a halogeno-aliphatic nitrile of the formula $$Hal_o-C(R_1)(R_2)-T_2-C\equiv N$$

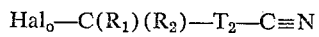

(which represents, for example, chloroacetonitrile, bromopropionitrile and the like) or with an unsaturated aliphatic nitrile, in which the double bond is sufficiently activated by the nitrile group to react with the amine (unsaturated aliphatic nitriles of that type are represented, for example, by acrylonitrile and the like), in the presence of a base, e.g. benzyl-trimethyl-ammonium hydroxide and the like, and, if necessary, separating the desired secondary amine compound from any simultaneously formed tertiary amine or removing any easily removable protective group (for example, by mild hydrogenolysis or hydrolysis). This latter method yields intermediates of the formula $$R-NH-C(R_1)(R_2)-A_2-C\equiv N$$

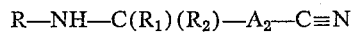

in which the group $A_2$ stands for alkylene.

A resulting intermediate of the formula $$R-NH-C(R_1)(R_2)-A_2-C\equiv N$$

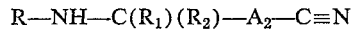

in which $A_2$, R, $R_1$ and $R_2$ have the previously-given meaning, when treated with a halogeno-aliphatic carboxylic acid halide of the formula $$Hal_o-CO-A_1-C(R_3)(R_4)-Hal$$

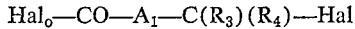

in which $A_1$, $R_3$, $R_4$ and Hal have the previously-given meaning, and $Hal_o$ stands for halogeno, particularly chloro, as well as bromo and the like, preferably in the presence of a suitable base, e.g. sodium carbonate, pyridine and the like, yields the desired starting material of the previously-given formula. The above reaction is preferably carried out in the presence of a suitable solvent, e.g. benzene, ethylene chloride and the like, and, if necessary, while cooling or at an elevated temperature.

Since the starting materials are readily available and can be prepared without difficulties according to several methods, the process of this invention is a very versatile one and is applicable to the preparation of a wide variety of diaza-cycloalkane compounds, having preferably from six to ten, more particularly from six to eight, ring members.

In the above formulae for the starting materials, as well as the final products, each of the groups $A_1$ and $A_2$, also standing for a direct bond, may represent a lower alkylene radical of straight or branched carbon chain, having preferably from one to four carbon atoms, particularly methylene, as well as 1,1-ethylene, 1,2-ethylene, 1-methyl-1,2-ethylene, 1,1-propylene, 1,3-propylene, 1,4-butylene and the like. The total number of carbon atoms representing the straight alkylene portion of $A_1$ and $A_2$ is preferably from zero to four, particularly from zero to two.

An organic radical representing R, as well as each of the groups $R_1$, $R_2$, $R_3$ and $R_4$ (which groups may also stand for hydrogen), is, for example, an aliphatic, cycloaliphatic, cycloaliphatic-aliphatic, carbocyclic aryl, carbocyclic aryl-aliphatic, heterocyclic aryl or heterocyclic aryl-aliphatic group.

Aliphatic groups have preferably from one to twelve carbon atoms and are represented, for example, by alkyl, especially lower alkyl, e.g. methyl, ethyl, n-propyl, isopropyl, n-butyl, isobutyl, secondary butyl, tertiary butyl, n-pentyl, isopentyl, neopentyl, n-hexyl, isohexyl, n-heptyl, n-octyl, 2,2,3,3-tetramethylbutyl, n-nonyl, n-decyl, n-undecyl, n-dodecyl and the like, alkenyl, particularly lower alkenyl, e.g. allyl, 2-methylallyl, 2-butenyl and the like, or alkynyl, particuarly lower alkynyl, e.g. propargyl and the like, or any other suitable aliphatic substituent.

Cycloaliphatic substituents are, for example, cycloalkyl having preferably from three to eight, particularly from five to seven, ring carbon atoms, e.g. cyclopropyl, cyclobutyl, cyclopentyl, 2-methyl-cyclopentyl, cyclohexyl, 2-isopropyl-cyclohexyl, 4,4-dimethyl-cyclohexyl, cycloheptyl, cyclo-octyl and the like, cycloalkenyl, having preferably from five to eight, particularly from five to seven, ring carbon atoms, e.g. 1-cyclopentenyl, 2-cyclopentenyl, 3-cyclopentenyl, 1-cyclohexenyl, 2-cyclohexenyl, 3-cyclohexenyl, 1-cycloheptenyl, 2-cycloheptenyl, 1-cyclo-octenyl and the like, or any other cycloaliphatic substituent.

Cycloaliphatic-aliphatic substituents are, for example, cycloalkyl-lower alkyl, in which cycloalkyl has preferably from three to eight, particularly from five to seven, ring carbon atoms, e.g. cyclopropylmethyl, cyclobutylmethyl, cyclopentylmethyl, 1-cyclopentylethyl, 2-cyclopentylethyl, 3-cyclopentylpropyl, cyclohexylmethyl, 1-cyclohexylethyl, 2-cyclohexylethyl, cycloheptylmethyl, 2-cycloheptylethyl, cyclo-octylmethyl and the like, cycloalkyl-lower alkenyl, in which cycloalkyl has preferably from three to eight, particuarly from five to seven, ring carbon atoms, e.g. 3-cyclopropylallyl, 3-cyclopentylallyl, 4-cyclopentyl-2-butenyl, 3-cyclohexyl-allyl and the like, cycloalkenyl-lower alkyl, in which cycloalkenyl has preferably from five to eight, particularly from five to seven, ring carbon atoms, e.g. 1-cyclopentenylmethyl, 2-(3-cyclopentenyl)-ethyl, 1-cyclohexenylmethyl, 3-cyclohexenylmethyl, 1-(2-cyclohexenyl)-ethyl, 1-cycloheptenylmethyl and the like, or any other cycloaliphatic-aliphatic substituent.

Aliphatic, as well as cycloaliphatic and cycloaliphatic-aliphatic radicals of the above type may contain substituents, particularly functional groups. The latter substitute primarly aliphatic radicals, particularly lower alkyl, as well as cycloaliphatic or cycloalphatic-aliphatic radicals; cycloaliphatic portions may also contain lower alkyl, e.g. methyl, ethyl, n-propyl, isopropyl and the like, as substituents. Functional groups are for example, oxygen-containing groups, such as, for example, hydroxyl, etherified hydroxyl, particularly lower alkoxy, e.g. methoxy, ethoxy, n-propyloxy, isopropyloxy, n-butyloxy, isobutyloxy and the like, as well as lower alkenyloxy, e.g. allyloxy, 2-butenyloxy and the like, polyalkylenedioxy, e.g. polyethylenedioxy, polypropylenedioxy and the like (which groups may contain from two to twenty lower alkylenedioxy portions, and which may have a free terminal hydroxyl group or an etherified terminal hydroxyl group, such as terminal lower alkoxy, e.g. methoxy, ethoxy and the like, group), carbocyclic aryloxy, such a monocyclic carbocyclic aryloxy, e.g. phenyloxy and the like, or carbocyclic aryl-lower alkoxy such as monocyclic carbocyclic aryl-lower alkoxy, e.g. benzyloxy, diphenylmethoxy, (4-chlorophenyl)-methoxy and the like, or any other suitable oxygen containing functional group.

Other functional substituents of aliphatic radicals, particularly lower alkyl, as well as cycloaliphatic or cycloaliphatic-aliphatic radicals, are nitrogen-containing groups, such as amino groups, for example, unsubstituted amino, or monosubstituted amino, for example N-lower alkyl-amino, e.g. N-methyl-amino, N-ethylamino and the like, N-carbocyclic aryl-amino, particularly N-monocyclic carbocyclic aryl-amino, e.g. N-phenyl-amino and the like, N-carbocyclic aryl-lower aliphatic hydrocarbon-amino, particularly N-monocyclic carbocyclic-lower alkyl-amino, e.g. N-benzyl-amino, N-(2-phenylethyl)-amino and the like, or N,N-di-substituted amino, such as N,N-di-lower alkyl-amino, e.g. N,N-dimethylamino, N-ethyl-N-methyl-amino, N,N-diethylamino, N,N-di-n-propylamino, N,N-di-isopropylamino and the like, N-cycloalkyl-N-lower alkyl-amino, in which cycloalkyl has from three to eight, preferably from five to seven, ring carbon atoms, e.g. N-cyclopentyl-N-methyl-amino, N-cyclohexyl-N-methyl-amino and the like, N-carbocyclic aryl-N-lower alkyl-amino, such as N-lower alkyl-N-monocyclic carbocyclic aryl-amino, e.g. N-methyl-N-phenyl-amino and the like, N-carbocyclic aryl-lower alkyl-N-lower alkyl-amino, such as N-lower alkyl-N-monocyclic carbocyclic aryl-lower alkyl-amino, e.g. N-benzyl-N-methyl-amino, N-methyl-N-(2-phenylethyl)-amino and the like, or 1-N,N-alkylene-imino, in which alkylene has from four to eight carbon atoms, such as 1-pyrrolidino, 2-methyl-1-pyrrolidino, 1 - piperidino, 2 - methyl-1-piperidino, 3-methyl-1-piperidino, 4-methyl-1-piperidino, 1-N,N-(1,6-hexylene)-imino, 1-N,N-(1,7-heptylene)-imino and the like, 1-N,N-oxa-alkylene-imino, in which alkylene has preferably four carbon atoms, e.g. 4-morpholino, 3-methyl-4-morpholino and the like, 1-N,N-thia-alkylene-imino, in which alkylene has preferably four carbon atoms, e.g. 4-thiamohpholino and the like, 1-N,N-aza-alkylene-imino, in which alkylene has from four to six carbon atoms, e.g. 1-piperazino, 4-methyl-1-piperazino, 4-ethyl-1-piperazino, 1-N,N-(3-aza-3-methyl - 1,6-hexylene)-imino, 1-N,N-(4-aza-4-methyl-1,7-heptylene)-imino and the like.

Sulfur-containing substituents of aliphatic radicals, especially lower alkyl, as well as cycloaliphatic or cycloaliphatic-aliphatic radicals, are primarily mercapto or etherified mercapto groups; the latter are represented by lower alkyl-mercapto, e.g. methylmercapto, ethylmercapto and the like, carbocyclic aryl-mercapto, such as monocyclic carbocyclic aryl-mercapto, e.g. phenylmercapto and the like, carbocyclic aryl-lower alkyl-mercapto, such as monocyclic carbocyclic aryl-lower alkyl-mercapto, e.g. benzylmercapto, 2-phenylethylmercapto and the like.

Also included as substituents of aliphatic radicals, particularly lower alkyl, as well as cycloaliphatic or cycloaliphatic-aliphatic radicals are halogeno atoms, e.g. fluoro, chloro, bromo and the like, whereby one or more than one halogen atom may be attached to one or more than one carbon atom.

Carbocyclic aryl substituents, are, for example, monocyclic or bicyclic carbocyclic aryl radicals, e.g. phenyl, 1-naphthyl or 2-naphthyl, or substituted phenyl, substituted 1-naphthyl or substituted 2-naphthyl, whereas carbocyclic aryl-aliphatic substituents are above all monocyclic or bicyclic carbocyclic aryl-aliphatic substituents, for example, phenyl-lower alkyl, e.g. benzyl, 1-phenylethyl, 2-phenylethyl, 3-phenylpropyl and the like, or substituted phenyl-lower alkyl, or naphthyl-lower alkyl, e.g. 1-naphthylenethyl, 2-(1-naphthyl)-ethyl, 2-naphthylmethyl, 1-(2-naphthyl)-ethyl and the like, or substituted naphthyl-lower alkyl.

Heterocyclic aryl substituents are, for example, monocyclic or bicyclic heterocyclic aryl, such as pyridyl, e.g. 2-pyridyl, 3-pyridyl or 4-pyridyl, thienyl, e.g. 2-thienyl and the like, furyl, e.g. 2-furyl and the like, quinolyl, e.g. 2-quinolyl, 4-quinolyl and the like, isoquinolyl, e.g. 1-isoquinolyl and the like, pyridazinyl, e.g. 3-pyridazinyl or 4-pyridazinyl, pyrimidyl, e.g. 2-pyrimidyl, 4-pyrimidyl and the like, pyrazinyl, e.g. 2-pyrazinyl and the like, or substituted pyridyl, substituted thienyl, substituted quinolyl, substituted isoquinolyl, substituted furyl, substituted pyridazinyl, subsituted pyrimidyl or substituted pyrazinyl, whereas heterocyclic aryl-aliphatic substituents are represented by monocyclic or bicyclic heterocyclic aryl-aliphatic substituents, such as pyridyl-lower alkyl, e.g. 2-pyridylmethyl, 2-(3-pyridyl)-ethyl, 4-pyridylmethyl and the like, thienyl-lower alkyl, e.g. 2-thienyl and the like, furyl-lower alkyl, e.g. 2-furfuryl and the like, quinolyl-lower alkyl, e.g. 2-quinolylmethyl and the like, isoquinolyl-lower alkyl, e.g. 2-(1-isoquinolyl)ethyl and the like, pyridazinyl-lower alkyl, e.g. 3-pyridazinylmethyl and the like, pyrimidyl-lower alkyl, e.g. 2-pyrimidylmethyl, 2-(2-pyrimidyl)-ethyl, 4-pyrimidylmethyl and the like, pyrazinyl-lower alkyl, e.g. 2-pyrazinylmethyl and the like, or analogous substituents, or substituted pyridyl-lower alkyl, substituted thienyl-lower alkyl, substituted furyl-lower alkyl, substituted quinolyl-lower alkyl, substituted isoquinolyl-lower alkyl, substituted pyridazinyl-lower alkyl, substituted pyrimidyl-lower alkyl, substituted pyrazinyl-lower alkyl or analogous substituents.

The above carbocyclic aryl radical, such as monocyclic or bicyclic carbocyclic aryl radicals, especially phenyl, as well as 1-naphthyl or 2-naphthyl, or the heterocyclic aryl, such as the monocyclic or bicyclic heterocyclic aryl, radicals, such as pyridyl and the like, may be substituted by one or more than one of the same or of different substituents, which may be attached to any of the positions available for substitution. Suitable substituents are, for example, lower alkyl, e.g. methyl, ethyl, n-propyl, isopropyl, n-butyl, isobutyl, secondary butyl, tertiary butyl, n-pentyl, 2,2,3,3-tetramethyl-butyl, 5,5-dimethyl-hexyl and the like, hydroxyl, etherified hydroxyl, such as lower alkoxy, e.g. methoxy, ethoxy, n-propyloxy, isopropyloxy, n- butyloxy and the like, lower alkenyloxy, e.g. allyloxy, 2-methyl-allyloxy, 2-butenyloxy and the like, lower alkylenedioxy, e.g. methylenedioxy, 1,1-ethylenedioxy and the like, or any other etherified hydroxyl group, esterified hydroxyl, such as halogeno (representing hydroxyl esterified by a hydrohalic acid), e.g. fluoro, chloro, bromo and the like, acyloxy, such as lower alkoxy-carbonyloxy, e.g. methoxycarbonyloxy, ethoxycarbonyloxy and the like, lower alkanoyloxy, e.g. acetyloxy, propionyloxy and the like, carbocyclic aryl-carbonyloxy, e.g. benzoyloxy, 3,4,5-trimethoxy-benzoyloxy, 4-chlorobenzoyloxy and the like, or any other esterified hydroxyl group, mercapto, etherified mercapto, such as lower alkyl-mercapto, e.g. methylmercapto, ethylmercapto and the like, nitro, amino, N-monosubstituted amino, such as N-lower alkyl-amino, e.g. N-methyl-amino, N-ethylamino and the like, N-acylamino, for example, N-lower alkanoyl-amino, e.g. N-acetylamino, N-propionylamino and the like, or any other N-monosubstituted amino, N,N-disubstituted amino, such as N,N-di-lower alkyl-amino, e.g. N,N-dimethylamino, N,N-diethylamino and the like, or any other N,N-disubstituted amino, polyhalogeno-lower alkyl, e.g. trifluoromethyl and the like, or any other suitable substituent.

While each of the groups $R_1$, $R_2$, $R_3$ and $R_4$ (representing also hydrogen) may stand for one of the above organic radicals, it represents primarily an aliphatic radical, especially lower alkyl, e.g. methyl, ethyl, n-propyl, isopropyl and the like, or any other aliphatic radical. The group R, representing one of the above organic radicals, is primarily a carbocyclic aryl, especially a monocyclic carbocyclic aryl radical, i.e. phenyl or substituted phenyl, as well as a bicyclic carbocyclic aryl radical, i.e. naphthyl or substituted naphthyl, or a heterocyclic aryl radical, such as a monocyclic heterocyclic aryl radical, particularly pyridyl or substituted pyridyl, or an aliphatic, particularly a lower alkyl radical; substituents of the substituted aryl radicals are primarily those mentioned above.

The reaction of this invention is particularly suitable for the preparation of asymmetrically substituted diaza-cycloalkane compounds of the previously-given formula, in which the groups $A_1$, $A_2$ and R have the above-given meaning, one of the groups $R_1$, $R_2$, $R_3$ and $R_4$ is an organic radical, and the others are hydrogen or an organic radical. Known methods for the preparation of asymmetrically substituted diaza-cycloalkane compounds involve many steps, they furnish the desired products in small yields only, and are not very suitable for large scale production. Preferred starting materials for the preparation of such asymmetrically substituted diaza-cycloalkane compounds are those of the previously-given formula, in which R, $A_1$ and $A_2$ have the previously-given meaning, one of the groups $R_1$, $R_2$, $R_3$ and $R_4$ stands for an organic radical, and the others represent hydrogen or an organic radical.

The method of this invention is, for example, particularly suitable for the preparation of asymmetrically substituted piperazine compounds having the formula

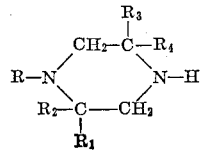

in which R has the previously-given meaning, but stands preferably for a carbocyclic aryl radical, especially a monocyclic carbocyclic aryl radical, i.e. phenyl or substituted phenyl, a bicyclic carbocyclic aryl radical, i.e. naphthyl or substituted naphthyl, a heterocyclic aryl radical, such as a monocyclic heterocyclic aryl radical, e.g. pyridyl or substituted pyridyl, or an aliphtic radical, e.g. lower alkyl, one of the groups $R_1$, $R_2$, $R_3$ and $R_4$ is an organic radical, especially lower alkyl, and the others are hydrogen or an organic radical, especially lower alkyl.

Preferred starting materials for the preparation of such asymmetrically substituted piperazine compounds are those of the formula

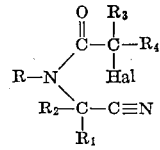

in which R, $R_1$, $R_2$, $R_3$ and $R_4$ and Hal have the above-given meaning, whereby one of the groups $R_1$, $R_2$, $R_3$ and $R_4$ is an organic substituent, particularly lower alkyl, and the others are hydrogen or an organic substituent, particularly lower alkyl.

Asymmetrically substituted piperazine compounds are used, for example, as intermediates for the preparation of pharmacologically useful compounds. Thus, upon reacting an asymmetrically substituted piperazine compound of the formula

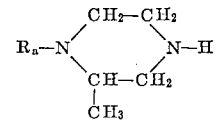

in which $R_a$ stands for a monocyclic carbocyclic aryl radical, i.e. phenyl or substituted phenyl, or a pyridyl radical, with a compound of the formula

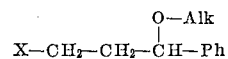

in which Ph is a monocyclic carbocyclic aryl radical, i.e. phenyl or substituted phenyl, Alk is lower alkyl, and X is an esterified hydroxyl group, particularly halogeno, for example, chloro, bromo and the like, a compound of the formula

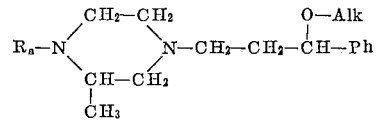

in which $R_a$, Ph and Alk have the previously-given meaning, or a salt thereof is formed. These compounds have, inter alia, adrenolytic properties and can be used, for example, in the treatment of Reynaud's disease and the like, as diagnostic tools to determine the proper functioning of the adrenal glands and the like. Prefered starting materials for the manufacture of the asymmetrically substituted piperazine compounds used in the above method for the prepartion of these compounds, are those of the formula

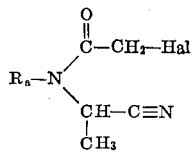

in which $R_a$ and Hal have the previously-given meaning.

Other compounds, for which the method of this invention provides a particularly suitable and economical process of manufacture, are those of the previously-given formula, in which R, $R_1$, $R_2$, $R_3$ and $R_4$ have the above meaning, one of the radicals $A_1$ and $A_2$ is an alkylene radical, and the other is a direct bond or a lower alkylene radical, i.e. diaza-cycloalkane compounds with more than six ring members. Known methods for the preparation of such diaza-cycloalkane compounds involve lengthy syntheses, requiring starting materials, which are not readily available, and usually proceed in low yields and are, therefore, not economically feasible. Preferred starting materials for the preparation of such diaza-cycloalkane compounds are those of the previously-given formula, in which R, $R_1$, $R_2$, $R_3$ and $R_4$ have the above meaning, one of the groups $A_1$ and $A_2$ is an alkylene radical, and the other is a direct bond or a lower alkylene radical.

A preferred group of compounds having more than six ring members and being prepared according to the method of this invention, are those of the formula

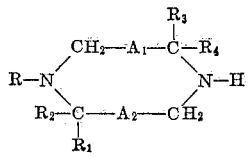

in which one of the groups $A_1$ and $A_2$ is a lower alkylene radical, and the other is a direct bond or a lower alkylene radical, R has the previously-given meaning, but stands preferably for a carbocyclic aryl radical, especially a monocyclic carbocyclic aryl radical, i.e. phenyl or substituted phenyl, a bicyclic carbocyclic aryl radical, i.e. naphthyl or substituted naphthyl, a heterocyclic aryl radical, such as a monocyclic heterocyclic aryl radical, e.g. pyridyl or substituted pyridyl, or an aliphatic radical, e.g. lower alkyl, and each of the radicals $R_1$, $R_2$, $R_3$ and $R_4$ is hydrogen or an organic radical, particularly lower alkyl.

Starting materials used for the preparation of such compounds are those of the formula

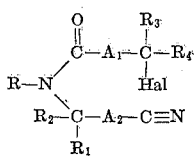

in which $A_1$, $A_2$, R, $R_1$, $R_2$, $R_3$, $R_4$ and Hal have the above-given meaning, whereby one of the groups $A_1$ and $A_2$ is a lower alkylene radical, and the other is a direct bond or a lower alkylene radical.

Diaza-cycloalkane compounds of the above type, having more than six ring members, are used, for example, as intermediates in the preparation of pharmacologically useful compounds. Thus, upon reacting a diaza-cycloalkane compound of the formula

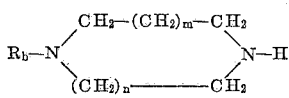

in which $R_b$ is an aliphatic radical, particularly lower alkyl, or a monocyclic carbocyclic aryl radical, i.e. phenyl or substituted phenyl, and each of the letters $m$ and $n$ stands for an integer from one to two, with a halogeno-lower alkano nitrile, converting the cyano group in the resulting compound to an aminomethyl group by reduction, and reacting the resulting amine compound with S-methylisothiurea sulfate, a compound of the formula

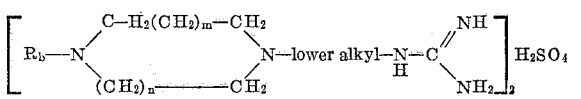

in which $R_b$ and the letters $m$ and $n$ have the previously-given meaning, is formed. Compounds of this type cause a lowering of blood pressure. Preferred starting materials for the manufacture of these diaza-cycloalkane compounds used in the above procedure for the preparation of these compounds, are those of the formula

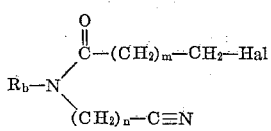

in which $R_b$, Hal and the letters $m$ and $n$ have the above-given meaning.

The invention also comprises any modification of the process wherein a compound obtainable as an intermediate at any stage of the process is used as starting material and the remaining step(s) of the process is(are) carried out, as well as any new intermediates. Included within the scope of the invention are, therefore, the novel intermediates having the following formula

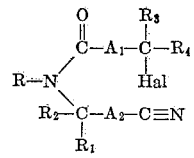

in which $A_1$, $A_2$, R, $R_1$, $R_2$, $R_3$, $R_4$ and Hal have the previously-given meaning. Especially useful as intermediates in the process of this invention are the compounds of the formula

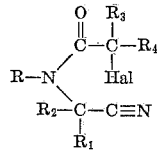

in which R has the previously-given meaning, but stands preferably for a carbocyclic aryl radical, especially a monocyclic carbocyclic aryl radical, i.e. phenyl or substituted phenyl, a bicyclic carbocyclic aryl radical, i.e. naphthyl or substituted naphthyl, a heterocyclic aryl radical, such as a monocyclic heterocyclic aryl radical, e.g. pyridyl or substituted pyridyl, or an aliphatic radical, e.g. lower alkyl, one of the groups $R_1$, $R_2$, $R_3$ and $R_4$ is an organic radical, especially lower alkyl, and the others are hydrogen or an organic radical, especially lower alkyl, and Hal is halogeno, particularly chloro, as well as bromo and the like; these intermediate compounds are illustrated by the compounds of the formula

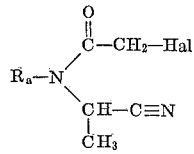

in which $R_a$ and Hal have the previously-given meaning. Also preferred as intermediates in the process of this invention, useful in the preparation of diaza-cycloalkanes having more than six ring members, are the compounds of the formula

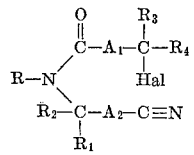

in which R has the previously-given meaning, but stands preferably for a carbocyclic aryl radical, especially a monocyclic carbocyclic aryl radical, i.e. phenyl or substituted phenyl, a bicyclic carbocyclic aryl radical, i.e. naphthyl or substituted naphthyl, a heterocyclic aryl radical, such as a monocyclic heterocyclic aryl radical, e.g. pyridyl or substituted pyridyl, or an aliphatic radical, e.g. lower alkyl, each of the radicals $R_1$, $R_2$, $R_3$ and $R_4$ is hydrogen or an organic radical, particularly lower alkyl, one of the groups $A_1$ and $A_2$ is a lower alkylene radical and the other is a direct bond or a lower alkylene radical; these intermediate compounds are illustrated by the compounds of the formula

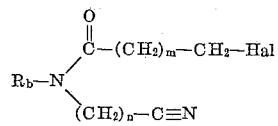

in which $R_b$, Hal and each of the letters $m$ and $n$ have the previously-given meaning.

The following examples are intended to illustrate the invention and are not to be construed as being limitations thereon. Temperatures are given in degrees Centigrade.

Example 1

A mixture of 11.37 g. of lithium aluminum hydride (0.3 mole) in 280 ml. of tetrahydrofuran is refluxed under an atmosphere of nitrogen for twenty minutes and is then cooled to 25°. A solution of 22.26 g. (0.1 mole) of N-(chloroacetyl)-N-(1-cyanoethyl)-aniline in 85 ml. of tetrahydrofuran is added dropwise over a period of eighteen minutes, while maintaining a temperature of about 25° or below by externally cooling. The mixture is then heated to boiling; the tetrahydrofuran is distilled off and gradually replaced by adding toluene at an equal rate until, after fifty minutes, a total of 500 ml. of distillate has been collected and the liquid temperature has reached 110°. The reaction mixture is refluxed for six hours, cooled to 25° and quenched by adding 18 ml. of water over a period of twenty-five minutes and 12.3 ml. of a 15 percent aqueous solution of sodium hydroxide over a period of ten minutes while maintaining a temperature of about 25°. After standing overnight, the inorganic precipitate is filtered off and washed with tetrahydrofuran, and the filtrate is evaporated to dryness.

The oily residue is refluxed for 2½ hours with 8.5 g. of sodium carbonate in 50 ml. of toluene; the inorganic material is filtered off and washed with toluene and the filtrate is evaporated to dryness. The oily residue, weighing 15.0 g. is distilled under reduced pressure to yield the 2-methyl-1-phenylpiperazine collected at 115–125°/1.0 mm.; yield of pure product: 10.3 g. (or 58.5 percent of theory).

The above 2-methyl-1-phenyl-piperazine is identified as the 2-methyl-1-phenyl-4-(N-phenyl-thiocarbamyl)-piperazine by reacting it with an equimolar amount of phenylisothiocyanate, and recrystallizing the solid product from ethanol; it melts at 158–160° and analyzes as follows:

Calculated (for $C_{18}H_{21}N_3S$): C, 69.50; H, 6.79; N, 13.48
Found: C, 69.36; H, 6.95; N, 13.47

The starting material is prepared as follows: To a solution of 830 g. of sodium hydrogen sulfite in 1540 ml. of water is added over a period of one hour 352 g. of acetaldehyde; the temperature of the reaction mixture is held at about 60–70° by cooling with ice. After stirring for an additional half hour, a total of 745.0 g. of aniline is added over a period of one-half hour and at a temperature of 60–70°; 200 ml. of water is added to keep the thick slurry stirrable and stirring is continued for an additional twenty minutes. Over a period of fifteen minutes and while maintaining the temperature below 70°, a solution of 405.0 g. sodium cyanide in 900 ml. of water is added; two liquid layers are formed after about one-third of the sodium cyanide solution has been added. The mixture is stirred for an additional twenty minutes and the hot mixture is then poured into two beakers and cooled to 10° while stirring. The crystalline precipitate is filtered off, washed with water and recrystallized by dissolving it in about 800 ml. of ethanol, diluting the solution with about 300 ml. of water and cooling the solution to −8°. The resulting N-(1-cyanoethyl)-aniline is filtered off, washed with water and dried under reduced pressure at 50°, M.P. 90–92°; yield: 720 g. (or 61.5 percent of theory).

A mixture of 17.4 g. of N-(1-cyanoethyl)-aniline and 12.6 g. of sodium carbonate in 87 ml. of benzene is placed into a flask containing an azeotropic water trap. A solution of 18.2 g. of chloroacetyl chloride in 87 ml. of benzene is added cautiously; the reaction mixture is then refluxed for seventy-five minutes, allowed to cool and to stand overnight. The inorganic material is filtered off, washed with benzene and the filtrate is evaporated. The oily residue is dissolved in 200 ml. of 50 percent aqueous ethanol; the desired N-(chloroacetyl)-N-(1-cyanoethyl)-aniline precipitates by scratching, seeding and cooling to −8°. The precipitate is filtered off, washed with water and dried under reduced pressure, M.P. 66–68°; yield: 25.2 g. (or 95.7 percent of theory). The product analyzes as follows:

Calculated (for $C_{11}H_{11}ClN_2O$): C, 59.33; H, 4.98; N, 12.58
Found: C, 59.00; H, 5.02; N, 12.56

Example 2

A suspension of 11.37 g. of lithium aluminum hydride (0.3 mole) in 280 ml. of tetrahydrofuran is refluxed for twenty minutes under an atmosphere of nitrogen and then cooled to 25°. A solution of 23.65 g. of N-(α-chloropropionyl)-N-(1-cyanoethyl)-aniline (0.1 mole) in 85 ml. of tetrahydrofuran is added to the suspension over a period of twenty minutes and at a temperature of 25°. The tetrahydrofuran is distilled off and replaced during the distillation by toluene added at an equal rate until about 500 ml. of distillate is recovered and the liquid temperature is about 110°. The reaction mixture is then refluxed for six hours, cooled to 25° and quenched with 18 ml. of water (added over a period of fifteen minutes) and 12.3 ml. of a 15 percent aqueous solution of sodium hydroxide (added over a period of ten minutes) while maintaining a temperature of 25°. After standing overnight, the inorganic material is filtered off and washed with toluene; the filtrate is evaporated to dryness and the oily residue is refluxed for 2½ hours with 8.5 g. of sodium carbonate in 50 ml. of toluene. The inorganic material is filtered off, washed with toluene, and the filtrate is evaporated to dryness to yield the 2,5-dimethyl-1-phenyl-piperazine; the residue is distilled and the product is collected at 117–125°/1.0 mm.; yield: 10.1 g. (or 57.4 percent of theory).

Upon treating 2,5-dimethyl-1-phenyl-piperazine with an equimolar amount of phenylisothiocyanate, the 2,5-dimethyl-1-phenyl-4-(N-phenyl-thiocarbamyl)-piperazine is formed; it melts at 163–165° (after recrystallization from ethanol) and analyzes as follows:

Calculated (for $C_{19}H_{23}N_3S$): C, 70.15; H, 70.7; N, 12.92
Found: C, 69.74; H, 6.84; N, 12.77

The starting material used in the above example is prepared as follows: To a suspension of 52.2 g. of N-(1-cyanoethyl)-aniline and 37.8 g. of sodium carbonate in 482 ml. of benzene is added dropwise and over a period of ten minutes, a solution of 49.5 g. of α-chloro-propionyl chloride in 100 ml. of benzene. The mixture is cautiously heated; at about 34° a vigorous foaming occurs, after which the reaction mixture is heated to reflux for 2½ hours. It is then cooled to room temperature and allowed to stand overnight. The inorganic materials are filtered off and washed with benzene, and the filtrate is evaporated. The oily residue is treated with 100 ml. of absolute ethanol; after scratching, seeding and cooling overnight at −8°, the N-(α-chloro-propionyl)-N-(1-cyanoethyl)-aniline precipitates, is collected, washed with cold ethanol and dried at 50° under reduced pressure, M.P. 83–86°; yield: 58.3 g. (or 70.4 percent of theory). The compound analyzes as follows:

Calculated (for $C_{12}H_{13}ClN_2O$): C, 60.91; H, 5.49; N, 11.84
Found: C, 60.83; H, 5.45; N, 11.82

Example 3

To a solution of 113.7 g. of lithium aluminum hydride (3 moles) 2,800 ml. of tetrahydrofuran under an atmosphere of nitrogen, is added over a period of thirty-five minutes 222.6 g. of N-(chloroacetyl)-N-(1-cyanoethyl)-aniline (1 mole) in 850 ml. of tetrahydrofuran while maintaining a temperature of about 25°. The temperature is then raised to boiling, the tetrahydrofuran is distilled off and gradually replaced by adding toluene at an equal rate until about 5,000 ml. of distillate is collected and the liqiud temperature reaches 110°. The reaction mixture is then refluxed for four hours, cooled and allowed to stand overnight at room temperature; it is quenched with 180 ml. of water and 123 ml. of a 15 percent aqueous solution of sodium hydroxide while maintaining a temperature of 25°. The inorganic material is filtered off, the filtrate is evaporated to dryness and the residue is distilled under reduced pressure; the desired 2-methyl-1-phenyl-piperazine is collected at 115–119°/1.0 mm.; yield: 87.6 g. (or 50 percent of theory).

*Example 4*

The crude N-(chloroacetyl)-N-(2-cyano-2-propyl)-aniline (prepared according to the procedure described below) is dissolved in 85 ml. of tetrahydrofuran and added dropwise to a solution of 12.0 g. of lithium aluminum hydride in 300 ml. of tetrahydrofuran. The mixture is heated to reflux for six hours while stirring, then cooled to 25° and quenched with 19 ml. of water, followed by 13 ml. of a 15 percent aqueous solution of sodium hydroxide. The inorganic material is filtered off, the filtrate is evaporated to dryness and the residue is refluxed, together with sodium carbonate in toluene, for 2½ hours. The organic material is filtered off, the filtrate is evaporated to dryness and the residue is distilled; the desired 2,2-dimethyl-1-phenyl-piperazine is collected at 110–115°/1.0 mm.; yield: 3.7 g.

The resulting product is identified as the 2,2-dimethyl-1-phenyl-4-(N-phenyl-thiocarbamyl)-piperazine by reacting equimolar amounts of 2,2-dimethyl-1-phenyl-piperazine and phenylisothiocyanate; the desired product melts at 193–195° after recrystallization from ethanol, and analyzes as follows:

Calculated (for $C_{19}H_{23}N_2S$): C, 70.15; H, 7.07; N, 12.92.
Found: C, 69.93; H, 7.13; N, 12.71.

The starting material used in the above example may be prepared as follows: To a solution of 312.2 g. of sodium hydrogen sulfite in 590 ml. of water is added 43.5 g. of acetone while maintaining a temperature of 60–70°. The reaction mixture is refluxed for forty-five minutes and then treated with 46.5 g. of aniline while maintaining a temperature of 95°. The reaction mixture is refluxed for one hour; 100 ml. of acetone is added, followed by a solution of 29.5 g. of sodium cyanide in 65 ml. of water. Refluxing is continued for thirty minutes; after cooling, the upper layer crystallizes, is filtered off, washed with 100 ml. of 50 percent aqueous ethanol and dried. A total of 68.8 g. of N-(2-cyano-2-propyl)-aniline is recovered, which melts at 92–94° after recrystallization from 50 percent aqueous ethanol.

A mixture of 19.2 g. of N-(2-cyano-2-propyl)-aniline and 14.8 g. of chloroacetyl chloride in benzene is refluxed in the presence of sodium carbonate according to the procedure described in Example 1. The crude material is used in the above treatment with lithium aluminum hydride; a sample of the N-(2-cyano-2-propyl)-N-(chloroacetyl)-aniline is recrystallized from ethyl acetate and melts at 88–90°.

*Example 5*

The crude N-(β-chloro-propionyl)-N-(1-cyanoethyl)-aniline (prepared according to the procedure described hereinbelow) is dissolved in 85 ml. of tetrahydrofuran, and the solution is added to 10.9 g. of lithium aluminum hydride in 300 ml. of tetrahydrofuran. The reaction mixture is refluxed for six hours, cooled to 25° and quenched with 17.3 ml. of water and 11.8 ml. of a 15 percent solution of sodium hydroxide in water. The inorganic material is filtered off, the filtrate is evaporated and the residue treated with sodium carbonate in refluxing toluene. After cooling, filtering and evaporating, the residue is distilled under reduced pressure; the residue is distilled to yield the 2-methyl-1-phenyl-1,4-diaza-cycloheptane, which is collected at 130–132°/1.0 mm.; yield: 4.6 g.

The starting material used in the above procedure is prepared according to the method described in Example 1, i.e. by refluxing a mixture of 29.2 g. of N-(1-cyanoethyl)-aniline and 27.7 g. of β-chloro-propionyl chloride in benzene in the presence of 21.2 g. of sodium carbonate for forty-five minutes, cooling the reaction mixture, filtering off the solid material and evaporating the solvent; the crude N-(β-chloro-propionyl)-N-(1-cyanoethyl)-aniline is used without further purification.

*Example 6*

A solution of 34.2 g. of crude N-(β-chloro-propionyl)-N-(1-cyanoethyl)-aniline in 150 ml. of tetrahydrofuran is added to a solution of 16.15 g. of lithium aluminum hydride in 400 ml. of tetrahydrofuran while maintaining a temperature of 37–40°; this temperature is maintained for an additional 21½ hours. After cooling to 20°, 25.1 ml. of water and 17.1 ml. of a 15 percent aqueous solution of sodium hydroxide are added while maintaining the temperature below 25°. The inorganic material is filtered off, the filtrate is evaporated and the residue is distilled under reduced pressure; the 2-methyl-1-phenyl-1,4-diaza-cycloheptane is collected at 118–120°/1.0 mm.; yield: 7.8 g. (or 33.9 percent based on N-(1-cyanoethyl)-aniline), and analyzes as follows:

Calculated (for $C_{12}H_{18}N_2$): C, 75.79; H, 9.46; N, 14.75.
Found: C, 75.63; H, 10.08; N, 14.32.

The starting material used in the above procedure may be prepared as follows: A mixture of 29.2 g. of N-(1-cyanoethyl)-aniline, 27.7 g. of β-chloro-propionyl chloride and 21.2 g. of sodium carbonate in 350 ml. of ethylene chloride is stirred at −15° for 2½ hours and allowed to stand at −35° to −40° for 16½ hours; a total of 56.6 g. of the desired N-(β-chloro-propionyl)-N-(1-cyanoethyl)-aniline is filtered off and used without further purification.

*Example 7*

To a solution of 7.58 g. of lithium aluminum hydride (0.2 mole) in 280 ml. of tetrahydrofuran in an atmosphere of nitrogen is added 22.26 g. of N-(chloroacetyl)-N-(1-cyanoethyl)-aniline (0.1 mole) in 85 ml. of tetrahydrofuran. The resulting mixture is refluxed for six hours, cooled to 25° and quenched with 12 ml. of water and 8.2 ml. of a 15 percent aqueous solution of sodium carbonate. The inorganic material is filtered off, and the residue is distilled to yield the 2-methyl-1-phenyl-piperazine which is collected at 115–120°/1.0 mm.; yield: 6.6 g.

*Example 8*

To a solution of 9.48 g. of lithium aluminum hydride (0.25 mole) in 280 ml. of tetrahydrofuran under an atmosphere of nitrogen is added 22.26 g. of N-(chloroacetyl)-N-(1-cyanoethyl)-aniline (0.1 mole) in 85 ml. of tetrahydrofuran. The resulting mixture is heated to boiling; the tetrahydrofuran is distilled off and replaced at the same rate by adding dry xylene until a total of 340 ml. of distillate is collected and the liquid temperature is 131°. The reaction mixture is refluxed for 6¾ hours, then cooled to 25° and quenched by adding 15 ml. of water and 10.25 ml. of a 15 percent aqueous solution of sodium hydroxide. The inorganic material is filtered off, the filtrate is evaporated, the residue is dissolved in 35 ml. of toluene, and the solution is refluxed for 2½ hours in the presence of 8.5 g. of sodium carbonate. After cooling, filtering and evaporating the solution, the residue is distilled under reduced pressure to yield the 2-methyl-1-phenyl-piperazine which is collected at 114–120°/1.0 mm.; yield: 11.15 g. (or 63.4 percent of theory).

*Example 9*

A solution of the crude N-(γ-chloro-butyryl)-N-(1-cyanoethyl)-aniline (as prepared according to the method described below) in 85 ml. of tetrahydrofuran is added to a solution of 10.9 g. of lithium aluminum hydride in 100 ml. of tetrahydrofuran. The reaction mixture is refluxed for six hours, cooled to 25° and quenched with 17.3 ml. of water and 11.8 ml. of a 15 percent aqueous solution of sodium hydroxide. The inorganic material is filtered off, the filtrate is evaporated to dryness and the residue in toluene is refluxed in the presence of sodium carbonate. After filtration and evaporation, the residue is distilled and the desired 2-methyl-1-phenyl-1,4-diaza-cyclo-octane is collected at 138–142°/1.0 mm.; yield: 10.4 g. It analyzes as follows:

Calculated (for $C_{13}H_{20}N_2$): C, 76.47; H, 9.74; N, 13.74. Found: C, 77.87; H, 9.74; N, 12.77.

The starting material used in the above example is prepared according to the method described in Example 1, i.e. by refluxing a mixture of 29.2 g. of N-(1-cyanoethyl)-aniline and 30.0 g. of γ-chloro-butyryl chloride in benzene in the presence of 21.2 g. of sodium carbonate for forty-five minutes, cooling the reaction mixture, filtering off the solid material and evaporating the solvent; the crude N-(γ-chloro-butyryl)-N-(1-cyanoethyl)-aniline is used without further purification.

Example 10

Upon reacting a 1:3-molar mixture of N-(chloroacetyl)-N-(cyanomethyl)-aniline and lithium aluminum hydride according to the procedure of Example 1, the 1-phenyl-piperazine is formed and purified by refluxing a solution of the crude material in toluene in the presence of sodium carbonate and distilling the residue after removing the inorganic material and evaporating the solvent, B.P. 156°/6 mm. The starting material used in the above example is prepared by reacting aniline with paraformaldehyde in the presence of hydrogen cyanide, and treating the resulting N-cyanomethyl-aniline with chloroacetyl chloride in the presence of sodium carbonate to yield the N-chloroacetyl-N-cyanomethyl-aniline.

Example 11

A solution of 0.1 mole of N-(chloroacetyl)-N-(cyanomethyl)-N-isopropyl-amine in tetrahydrofuran is added to 0.3 mole of lithium aluminum hydride in tetrahydrofuran; the reaction is carried out as described in the previous examples to yield the 1-isopropyl-piperazine, which is purified by distillation and collected at 156–163°. The starting material used in the above procedure is prepared by reacting isopropylamine with paraformaldehyde in the presence of potassium cyanide and treating the resulting N-cyanomethyl - N - isopropyl-amine with chloroacetyl chloride; these reactions are carried out according to the method described in the previous examples.

Example 12

The 1-(o-chloro-phenyl)-2-methyl - 1,4-diaza-cycloheptane is prepared by reacting a solution of 0.15 mole of lithium aluminum hydride in tetrahydrofuran with 0.05 mole of o-chloro-N-(β-chloro-propionyl)-N-(1 - cyanoethyl)-aniline in tetrahydrofuran according to the procedure described in Example 6. The starting material used in the above procedure is prepared by reacting the acetaldehyde-sodium hydrogen sulfite addition compound with o-chloro-aniline in the presence of potassium cyanide and treating the resulting o-chloro-N-(1-cyanoethyl)-aniline with β-chloropropionyl chloride; these reactions are carried out as previously described.

Example 13

The N-(α-chloro-propionyl) - N - (1-cyanopropyl)-p-methyl-aniline (0.1 mole) in tetrahydrofuran, when added to a solution of 0.3 mole of lithium aluminum hydride in tetrahydrofuran according to the previously-described procedure, yields the 2-ethyl - 5 - methyl-1-(p-methyl-phenyl)-piperazine. The starting material used for the preparation of this compound according to the above procedure is prepared by reacting the propionaldehyde-sodium hydrogen sulfite addition compound with p-toluidine in the presence of potassium cyanide to form the N-(1-cyanopropyl)-p-methyl-aniline, which is then treated with α-chloro-propionyl chloride according to the above-described procedure to yield the desired N-(α-chloro-propionyl)-N-(1-cyanopropyl)-p-methyl-aniline.

Example 14

The 1-methyl-2-phenyl-piperazine is prepared by adding a solution of 0.2 mole of N-(chloroacetyl)-N-(α-cyano-benzyl)-N-methyl-amine in tetrahydrofuran to a solution of 0.6 mole of lithium aluminum hydride, replacing the solvent by toluene and working up the resulting product according to the previously-described method. The starting material used in the above procedure is prepared by adding an aqueous solution of methylamine to the benzaldehyde-sodium hydrogen sulfite addition compound in water, treating the resulting compound with sodium cyanide in water, and reacting the resulting N-(α-cyanobenzyl)-N-methylamine with chloroacetyl chloride.

Example 15

A solution of 0.3 mole of lithium aluminum hydride in tetrahydrofuran is treated with a solution of 0.1 mole of N-(chloroacetyl)-N-(1 - cyano-2-butenyl)-N-(p-methoxy-benzyl)-amine; the reaction mixture is worked up as shown in the previous examples to yield the 1-(p-methoxy-benzyl)-2-(1-propenyl)-piperazine. The starting material used in the above example is prepared by reacting the crotonaldehyde-sodium hydrogen sulfite addition compound with p-methoxy-benzylamine in the presence of sodium cyanide and treating the resulting N-(1-cyano-2-butenyl)-N-(p-methoxy-benzyl)-amine with chloroacetyl chloride.

Example 16

A solution of 0.15 mole of lithium aluminum hydride in tetrahydrofuran is treated with a solution of 0.05 mole of N-(α-chloro-phenylacetyl)-N-(1-cyanoethyl)-N-(2-naphthyl)-amine in tetrahydrofuran, the solvent is replaced by xylene and the reaction mixture is worked up as previously described to yield the 2-methyl-1-(2-naphthyl)-5-phenyl-piperazine. The starting material is prepared according to the previously-described procedure, i.e. by reacting the acetaldehyde-sodium hydrogen sulfite addition compound with β-naphthylamine in the presence of sodium cyanide and treating the resulting N-(1-cyanoethyl) - N - (2-naphthyl)-amine with α-chloro-phenylacetyl chloride.

Example 17

The 1 - cyclohexyl - 2 - isopropyl - 1,4 - diazo - cycloheptane is prepared by treating a solution of 0.3 mole of lithium aluminum hydride in tetrahydrofuran with a solution of 0.1 mole of N-(β-chloro-propionyl)-N-cyclohexyl-N-(1-cyano-isobutyl)-amine in tetrahydrofuran according to the previously-described procedure. The starting material is prepared by reacting the isobutyraldehyde-sodium hydrogen sulfite addition product with cyclohexylamine in the presence of sodium cyanide and treating the resulting N-cyclohexyl-N-(1 - cyano-isobutyl)-amine with β-chloro-propionyl bromide; these reactions are carried out according to the previously-described methods.

Example 18

A solution of 0.1 mole of lithium aluminum hydride in tetrahydrofuran is treated with a solution of 0.05 mole of N-(α-chloro-propionyl) - N - cyclopentylmethyl-N-(1-cyanoethyl)-amine in tetrahydrofuran; the solvent is replaced by toluene and the reaction mixture yields the 1-cyclopentylmethyl-2,5-dimethyl-piperazine. The starting material used in the above procedure is prepared by reacting the acetaldehyde-sodium hydrogen sulfite addition compound with cyclopentylmethylamine in the presence of sodium cyanide and treating the resulting N-cyclopentylmethyl-N-(1-cyanoethyl)-amine with α-chloro-propionyl chloride; these reactions are carried out as previously described.

Example 19

The 2-benzyl-5-ethyl-1-phenyl-piperazine is prepared by adding a solution of 0.1 mole of N-(α-chloro-butyryl)-N-(1-cyano-2-phenylethyl)-aniline in tetrahydrofuran to a solution of 0.3 mole of lithium aluminum hydride in tetrahydrofuran, replacing the solvent by toluene and working up the reaction mixture according to the previously-described procedure. The starting material used in the above procedure is prepared as follows: The phenylacetaldehyde-sodium hydrogen sulfite addition compound in water is treated with aniline and to the mixture is added a solution of sodium cyanide, and the resulting N-(1-cyano-2-phenylethyl)-aniline is then reacted with α-chloro-butyl chloride; these reactions are carried out according to the previously-described methods.

Example 20

A solution of 0.03 mole of N-(chloroacetyl)-N-(2-cyanoethyl)-N-methyl-amine in tetrahydrofuran is added to a solution of 0.09 mole of lithium aluminum hydride in tetrahydrofuran; the reaction is carried out as previously described to yield the 1-methyl-1,4-diazo-cyclo-heptane, which is purified by distillation and collected at 71–73°/32 mm. The starting material used in the above procedure is prepared by reacting methylamine with acrylonitrile in the presence of a small amount of benzyl-trimethyl-ammonium hydroxide, and the resulting N-(2-cyanoethyl)-N-methyl-amine is reacted with chloroacetyl chloride to yield the desired N-(chloroacetyl)-N-(2-cyano-ethyl)-N-methyl-amine.

Example 21

The 1-methyl-1,5-diazo-cyclo-octane is prepared by adding a solution of 0.05 mole of N-(2-cyanoethyl)-N-methyl-amine in tetrahydrofuran to a solution of 0.15 mole of lithium aluminum hydride in tetrahydrofuran and carrying out the reaction as previously described; the desired product is purified by distillation and collected at 72–75°/12 mm. It is characterized as the dihydro-bromide, M.P. 215–217°, which is prepared by adding a 48 percent solution of hydrogen bromide to the solution of the base in isopropanol and recrystallized from ethanol. The starting material used in the above procedure is prepared by reacting the N-(2-cyanoethyl)-N-methyl-amine of Example 20 with β-chloropropionyl chloride according to the previously-described procedure.

Example 22

To a solution of 0.3 mole of lithium aluminum hydride in tetrahydrofuran is added 0.1 mole of N-(bromoacetyl)-N-(1-cyanoethyl)-aniline in tetrahydrofuran; the reaction is carried out as described in Example 1 to yield the desired 2-methyl-1-phenyl-piperazine, which is purified by distillation and collected at 115–125°/1.0 mm. In the above example, the lithium aluminum hydride may be replaced by an equivalent amount of sodium aluminum hydride, magnesium aluminum hydride or aluminum hydride. The starting material used in the above procedure is prepared by reacting N-(1-cyanoethyl)-aniline with bromoacetyl bromide according to the procedure described in Example 1.

What is claimed is:

1. Process for the manufacture of a diaza-cycloalkane compound of the formula

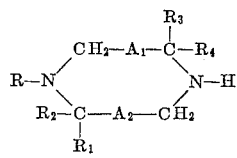

in which each of the radicals $A_1$ and $A_2$ is a member selected from the group consisting of a direct bond and a lower alkylene radical, R is an organic substituent, and each of the groups $R_1$, $R_2$, $R_3$ and $R_4$ is a member selected from the group consisting of hydrogen and an organic substituent, which comprises treating a compound of the formula

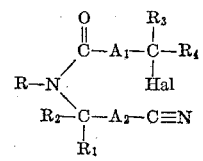

in which $A_1, A_2$, R, $R_1$, $R_2$, $R_3$ and $R_4$ have the previously-given meaning, and Hal is halogeno, with an aluminum hydride reducing reagent in the presence of an organic solvent, decomposing the resulting complex by adding an inorganic base and water, and isolating the desired diaza-cycloalkane compound from the organic solution.

2. Process according to claim 1, which comprises using as the starting material a compound of the formula

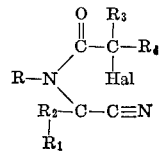

in which R is an organic substituent, one of the groups $R_1$, $R_2$, $R_3$ and $R_4$ is lower alkyl, and each of the others is a member selected from the group consisting of hydrogen and lower alkyl, and Hal is halogeno.

3. Process according to claim 2, which comprises using as the starting material a compound of the formula

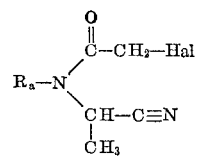

in which $R_a$ is a member selected from the group consisting of monocyclic carbocyclic aryl and pyridyl, and Hal stands for halogeno.

4. Process according to claim 1, which comprises using as the starting material a compound of the formula

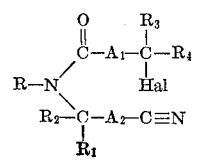

in which one of the groups $A_1$ and $A_2$ is lower alkylene and the other is a member selected from the group consisting of a direct bond and lower alkylene, R is an organic substituent, each of the groups $R_1$, $R_2$, $R_3$ and $R_4$ is a member selected from the group consisting of hydrogen and lower alkyl, and Hal is halogeno.

5. Process according to claim 1, which comprises using lithium aluminum hydride as the aluminum hydride reducing reagent.

6. Process according to claim 1, which comprises using as an organic solvent a solvent which is inert towards the aluminum hydride reagent and has a boiling point between 35° and below about 150°.

7. Process according to claim 6, which comprises using tetrahydrofuran as the organic solvent.

8. Process according to claim 6, which comprises using toluene as the organic solvent.

9. Process according to claim 6, which comprises using xylene as the organic solvent.

10. Process according to claim 1, which comprises carrying out the treatment of the starting material with the aluminum hydride reducing reagent at a temperature of between about 35° and about 140°.

11. Process according to claim 1, which comprises decomposing the resulting complex by adding about stoichiometric amounts of the inorganic base.

References Cited by the Examiner

UNITED STATES PATENTS

| | | | |
|---|---|---|---|
| 2,605,263 | 7/1952 | Culver et al. | 260—268 |
| 2,760,971 | 8/1956 | Surrey | 260—465 |
| 2,809,196 | 10/1957 | Miller | 260—268 |
| 2,927,126 | 3/1960 | Pursglove | 260—465 |
| 3,040,029 | 6/1962 | Poppelsdorf et al. | 260—239 |
| 3,098,066 | 7/1963 | Mull | 260—239 |

OTHER REFERENCES

Elderfield, Heterocyclic Compounds, vol. 1, pages 650–655, published by John Wiley and Sons, Inc., 1950.

Winans et al., Journal American Chemical Society, vol. 55, pages 4167–4176, 1933.

NICHOLAS S. RIZZO, *Primary Examiner.*

HENRY R. JILES, *Examiner.*

ALTON D. ROLLINS, JAMES W. ADAMS,
*Assistant Examiners.*